United States Patent [19]

Upadhya

[11] Patent Number: 4,962,519
[45] Date of Patent: Oct. 9, 1990

[54] LUBRICATED BEARING RETAINER FOR X-RAY TUBE

[75] Inventor: Kamleshwar Upadhya, Glendale, Wis.

[73] Assignee: General Electric Company, Milwaukee, Wis.

[21] Appl. No.: 468,376

[22] Filed: Jan. 22, 1990

Related U.S. Application Data

[63] Continuation-in-part of Ser. No. 331,508, Mar. 31, 1989, Pat. No. 4,914,684.

[51] Int. Cl.$^5$ .............................................. H01J 35/10
[52] U.S. Cl. .................................... 378/133; 378/125
[58] Field of Search ........................ 378/132, 133, 125

[56] References Cited

U.S. PATENT DOCUMENTS 4,097,759 6/1978 Furbee et al. .
4,097,760 6/1978 Cinelli .
4,272,696 6/1981 Stroble et al. .
4,293,171 10/1981 Kakumoto et al. .
4,490,264 12/1984 Gerkema et al. .
4,508,396 4/1985 Dei et al. .
4,569,070 2/1986 Schubert et al. .

FOREIGN PATENT DOCUMENTS 60-198046 10/1985 Japan .
60-211750 10/1985 Japan .

Primary Examiner—Craig E. Church
Attorney, Agent, or Firm—Quarles & Brady

[57] ABSTRACT

A bearing retainer for mounting for a bearing in an X-ray tube, the X-ray tube having a rotating anode supported on an anode shaft held within a hollow anode stem, the retainer being slidably fitted into a hollow anode stem to hold one bearing coaxially with the anode shaft and to permit axial motion of the bearing so held, where the sliding surface of the bearing retainer is coated with a solid lubricant, and wherein the bearing retainer includes a bearing flange not coated with lubricant which may be swaged around the outer race of the bearing to hold the bearing.

6 Claims, 2 Drawing Sheets

ID=4,962,519

LUBRICATED BEARING RETAINER FOR X-RAY TUBE

This application is a continuation-in-part of application Ser. No. 07/331/508 filed 3/31/89, now U.S. Pat. No. 4,914,684.

BACKGROUND OF THE INVENTION

This invention relates to X-ray tubes having rotating anodes and more particularly to a retainer for supporting the bearings used in X-ray tubes.

A principal component of conventional X-ray equipment and computed tomography (CT) equipment is an X-ray tube which provides the source of X-rays. Such tubes contain a vacuum at $10^{-8}$ to $10^{-9}$ torr and operate by accelerating a stream of electrons from a heated cathode through a high voltage against a target anode. The conversion efficiencies of such tubes are low and therefore considerable heat is generated in the anode as a by-product of the X-rays generated.

In order to reduce the concentration of heat in the anode, the anode is rotated at speeds up to 10,000 RPM thereby continuously presenting the cathode a new and cooler surface. In a high performance X-ray tube, the surface of the anode may reach temperatures of 3200° C., and areas of the anode outside the immediate target surface may rise to temperatures of approximately 1300° C.

Much of the heat generated in the anode is radiated through the glass walls of the tube from high emissivity anode coatings. Even so, the anode shaft and support bearings on which the anode rotates, may rise to temperatures of up to 450° C. It should be noted that the anode shaft and bearings are contained within the evacuated X-ray tube envelope.

To prolong bearing life it is generally known to preload the bearings supporting the anode shaft. Typically, a front bearing is held fixed with respect to the anode stem and the rear bearing's outer race is held in a retainer that is free to slide axially within a hollow anode stem. The rear bearing's inner race 46 is affixed to the anode shaft. The ability of the bearing retainer to slide axially prevents binding of the bearings when the anode shaft expands as the X-ray tube rises in temperature. A preload spring applies an axial force to the rear retainer to provide preloading to both bearings. The preloading force improves the tracking of the bearing ball sandwiched between the inner and outer races of both front and rear bearings, increasing bearing life and reducing bearing noise.

The combined effect of high rotational speed, high operating temperatures and a vacuum environment places severe demands on the anode support bearings. Accordingly, bearing failure is the chief limit to X-ray tube life. Such failure may result either from bearing "freeze", a seizure of the rolling elements of the bearing within their races, or from an increase in bearing noise which may necessitate tube replacement despite otherwise acceptable operation.

The extreme operation temperatures and high vacuum environment to which the retainer and anode stem are subjected prevents the use of conventional organic lubricants in this application.

SUMMARY OF THE INVENTION

The sliding bearing retainer holding the rear bearing fits closely within the guiding anode stem to prevent excessive radial play in the anode shaft. As described above, the bearing retainer is intended to allow the anode shaft to expand in length with increasing X-ray tube temperature. Previously, it was not considered necessary to lubricate the bearing retainer because of the infrequent nature of this motion. It is now believed, however, that various motions of the bearing retainer during normal operation of the X-ray tube, including direct impact on the stem wall which may result in a "chattering" noise of the bearings, generate quantities of "wear" particles. Such wear particles contaminate the bearings causing increased bearing noise and wear.

In the present invention, one of the bearings supporting the rotating anode shaft of an X-ray tube is held in a retainer which slides within a hollow anode stem. The outer sliding surface of a bearing retainer is coated with a thin solid lubricating layer. This lubricating layer provides a surface that reduces wear between the sliding bearing retainer and the inside of the anode stem and also minimizes the generation of wear particles.

It is thus a general object of the invention to provide a lubrication means suitable to the environment of an X-ray tube to reduce wear between the sliding bearing retainer and the supporting anode stem and thus decrease wear of bearing components caused by generation of particles within the bearing system.

It has been further determined that bearing failure may result from adhesive material transfer between the bearing retainer and the anode stem. The lubricating layer serves additionally to reduce adhesive wear of the sliding surfaces of the retainer and the anode stem. This wear may increase friction between the sliding surface of the retainer and the anode stem or conversely increase the radial play of the retainer in the anode shaft.

It is thus another object of the invention to prevent alteration of the sliding characteristics of the retainer in the stem that might adversely affect bearing life.

The bearing sleeve includes a bearing retainer flange which is deformable to be swaged over the bearing to hold the outer bearing race positively with respect to the retainer. No lubrication is applied to this layer to prevent the unnecessary shedding of lubricating particles during the swaging process.

Another object of the invention is to reduce the introduction of particles to the bearing assembly.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
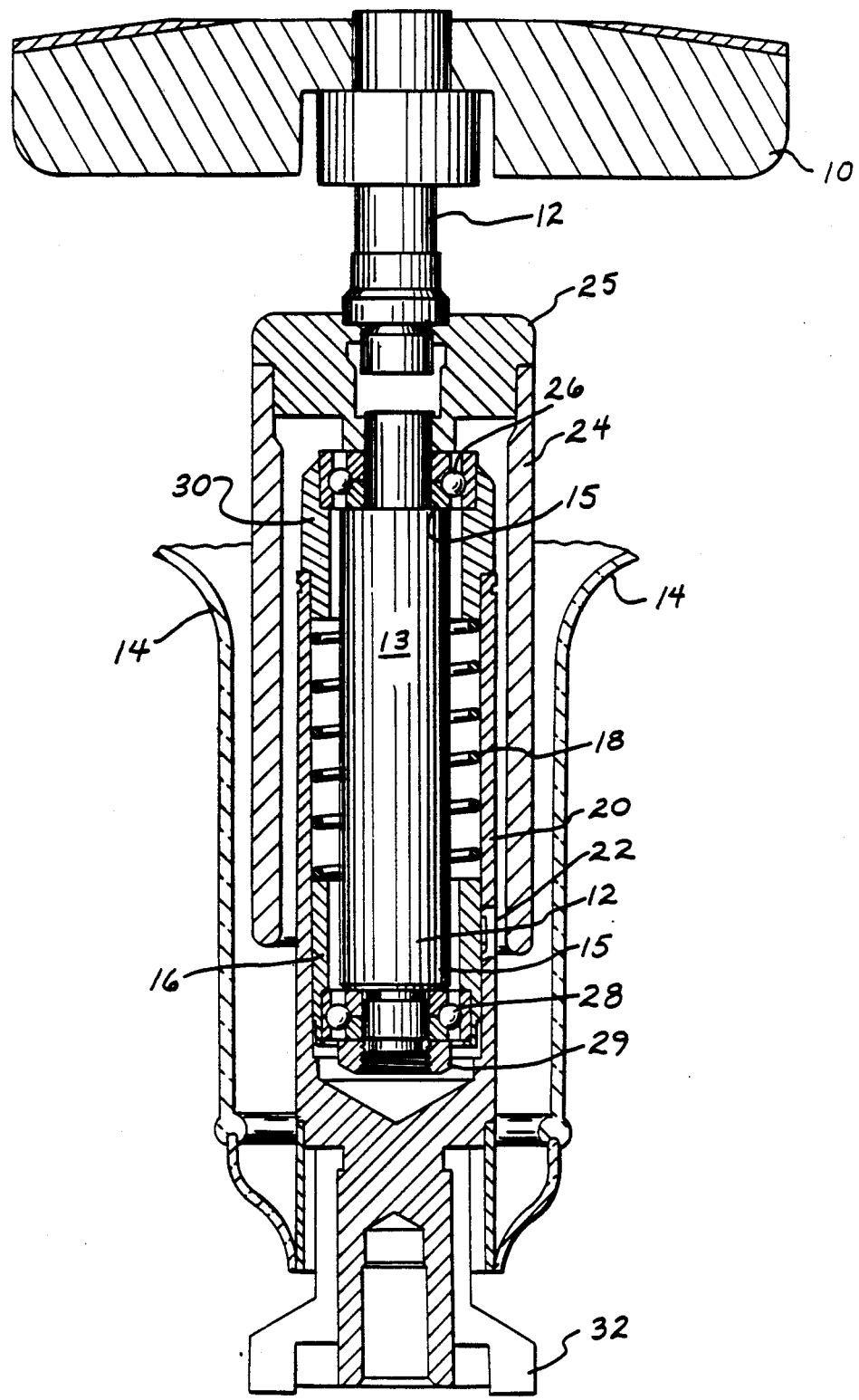
FIG. 1 is a fragmentary view of an X-ray tube showing a partial sectional view of the anode support structure including the bearing retainers.

Referring to FIG. 1, a disk shaped anode 10 is affixed at its axis to the front end of anode shaft 12 so as to rotate with rotation of anode shaft 12. The rear end of anode shaft 12 is received within rotor sleeve collar 25 which in turn supports a copper rotor sleeve 24, to be described below, and a bearing shaft 13 which extends rearward from the collar 25 in alignment with the anode shaft 12.

A front bearing 26 supports the front end of the bearing shaft 13 and has its inner race 46 captured between the rear surface of the rotor sleeve collar 25 and the front surface of a bearing shaft front lip 15 on the bearing shaft 13. A rear bearing 28 supports the rear end of the bearing shaft 13 and has its inner race 46 captured between the rear surface of bearing shaft rear lip 17 at the rear of the bearing shaft 13 and the front surface of rear bearing nut 29 which is threaded on to the rear end of bearing shaft 13.

Surrounding bearing shaft 13 is a copper alloy tubular anode stem 20. Affixed to the front end of the anode stem 20 is front bearing retainer 30 which in turn holds the outer race 50 of front bearing 26 coaxially with the anode stem 20. Slidably fitting within the rear end of anode stem 20 is a rear bearing retainer 16 holding the outer race 50 of rear bearing 28 coaxially within the anode stem 20.

A molybdenum preload spring 18 coaxially surrounds the bearing shaft 13 within the anode stem 20 so as to exert an axial outward force on the front and rear bearing retainers 30 and 16. Rear bearing retainer 16 slides axially within the anode stem 20 to take up axial play between the inner and outer races of the front and rear bearings 26 and 28 under this preload force.

Figure 2:
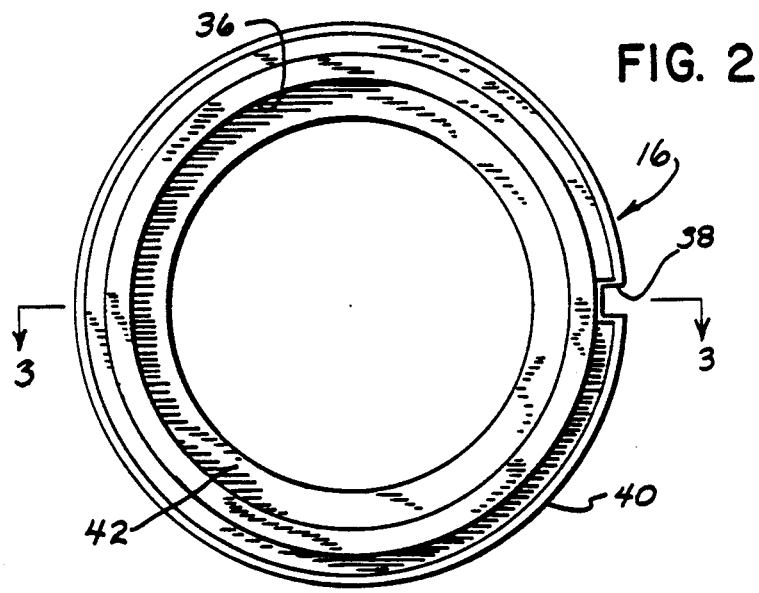
FIG. 2 is an end view of the rear bearing retainer used in the X-ray tube of FIG. 1 showing the placement of the solid lubricant coating.

Referring to FIG. 2, rear bearing retainer 16 includes a keyway 38 cut axially in its outer surface. An antirotation screw 22, shown in FIG. 1, engages the keyway 38 thereby preventing the rear bearing retainer 16 from rotating with respect to the anode stem 20.

Referring again to FIG. 1, the front bearing 26 and the front bearing retainer 30 and the front portion of the anode stem 20 are coaxially surrounded by a cylindrical, tubular copper rotor sleeve 24, which as mentioned is attached to the anode shaft 12 and hence the bearing shaft 13 by the sleeve collar 25 so as to rotate with the anode 10. The copper rotor sleeve 24 serves as an armature for an induction motor (not shown) which provides torque to spin the anode shaft 12 during operation of the X-ray tube.

The above described anode assembly is contained in a glass envelope 14 which may be evacuated to $10^{-9}$ torr. Directed toward the front surface of the anode 10 and also within the glass envelope 14 is a cathode (not shown) which emits a stream of high energy electrons toward the face of the spinning anode 10 as is understood in the art.

Figure 3:
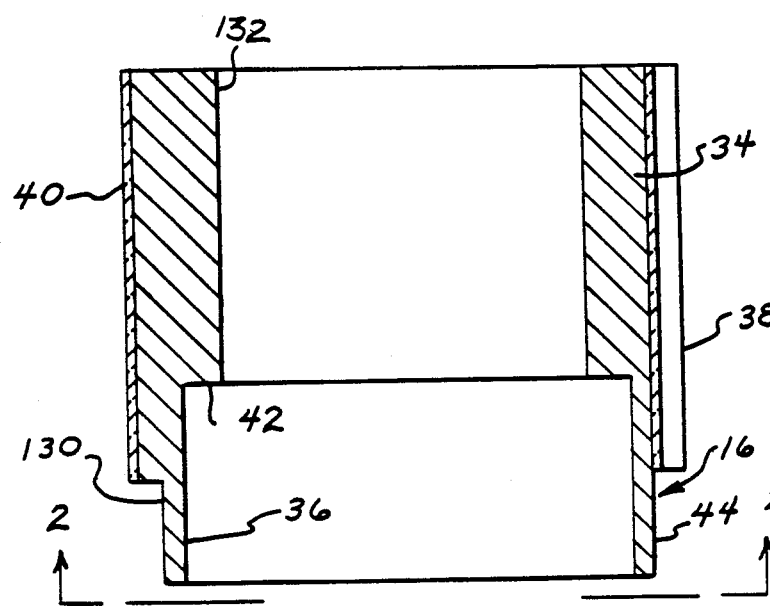
FIG. 3 is a sectional view of the retainer of FIG. 2 taken along lines 3—3 of FIG. 2.

Referring generally to FIG. 2 and 3, the rear bearing retainer 16 is comprised of a cylindrical retainer substrate 34 of 304 LSS stainless steel specified by the following weight percentages: 18 Cr, 8 Ni, 1 Si (max.), 1 Mn, 0.08 C (ax), balance Fe. The retainer 16 is machined to tolerance of 0.0005 inches on its outside diameter.

The outer surface of the retainer substrate 34 is coated with a 3-7 $\mu$m thick coating of a solid lubricant suitable for use in the previously described environment of an X-ray tube. Suitable solid lubricants include metals such as lead and silver, disulfides and diselenides such as Tungsten Disulfide ($WS_2$) and Tungsten Diselenide ($WSe_2$); Diamond or Diamond-like carbon (DLC) and similar such materials as are known in the art. These lubricants may be applied to the retainer by a number of methods, also known in the art, including Physical Vapor Deposition, specifically Plasma-Enhanced Physical Vapor Deposition (PEPVD) and Chemical Vapor Deposition and Plasma-Enhanced Chemical Vapor Deposition (PECVD)

Figure 4:
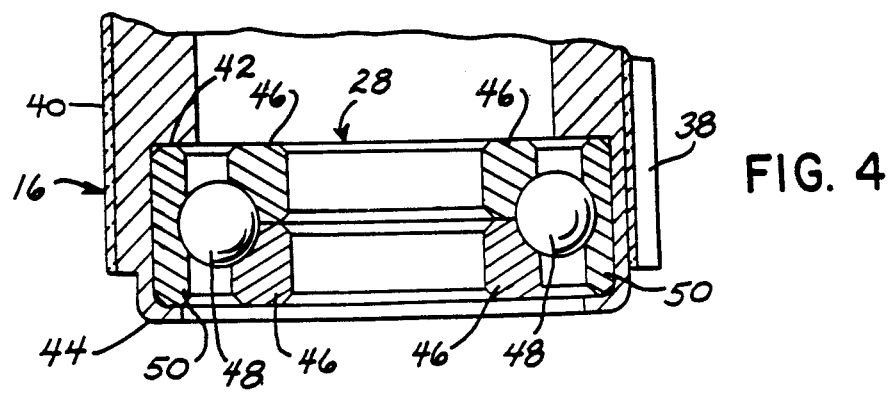
FIG. 4 is a section view of the rear bearing retainer similar to that of FIG. 3 showing the placement of the bearing within the bearing retainer and the swaging of the bearing retainer flange.

The retainer 16 is axially drilled to provide a substrate inner surface 132 and the rear of retainer 16 is counterbored to the outside diameter of the rear bearing 28 so as to form a bearing retaining sleeve 36 and radial bearing stop 42 to receive the outer race 50 of the rear bearing 28 as shown in FIG. 4.

Referring again to FIG. 3, the rear end of the bearing sleeve 130 is of reduced outside diameter to form a bearing retainer flange 44. The bearing retainer flange 44 does not contact the anode stem 20 when the bearing retainer 16 is assembled in the X-ray tube. The outer surface of the bearing retainer flange 44 is not coated with lubricant.

Referring to FIG. 4, the rear bearing 28 is inserted axially into the bearing retainer sleeve 36 whereupon the bearing retainer flange 44 is swaged around the rear radial face of the outer race 50 of the rear bearing 28 capturing the outer race 50 between a front face of the bearing retainer flange 44 and the rear face of the bearing stop 42.

A preferred embodiment of the invention has been described, but it should be apparent to those skilled in the art that many variations can be made without departing from the spirit of the invention. For example a sliding retainer may be used with the front bearing alone or in addition to the sliding retainer holding the rear bearing.

I claim:

1. In an X-ray tube having a hollow anode stem having an inner surface and containing an anode shaft supported by one or more bearings having inner and outer races, a bearing retainer comprising:
    a retainer substrate means for slidably fitting coaxially within the hollow anode stem;
    a bearing sleeve means coaxially affixed to the retainer substrate for holding an outer race of a bearing fixedly and coaxially with respect to the retainer substrate;
    a solid lubricant applied to the outer circumference of the retainer substrate for lubricating the sliding of the retainer means.

2. The bearing retainer of claim 1 wherein the solid lubricant is selected from the group consisting of silver and lead.

3. The bearing retainer of claim 1 wherein the solid lubricant is a metallic disulfide.

4. The bearing retainer of claim 1 wherein the solid lubricant is a metallic diselenide.

5. The bearing retainer of claim 1 wherein the solid lubricant is Diamond-like carbon.

6. The bearing retainer of claim 1 wherein the solid lubricant is Diamond.

* * * * *